United States Patent [19]

Roiger

[11] Patent Number: 5,222,562
[45] Date of Patent: Jun. 29, 1993

[54] CULTIVATOR ATTACHMENT

[76] Inventor: Duane E. Roiger, Rte. 3, Box 67, Springfield, Minn. 56087

[21] Appl. No.: 795,031

[22] Filed: Nov. 20, 1991

[51] Int. Cl.⁵ ............................................. A01B 39/26
[52] U.S. Cl. .................................... 172/73; 172/120; 172/510
[58] Field of Search ............... 172/508, 509, 510, 513, 172/63, 73, 112, 120, 124

[56] References Cited

U.S. PATENT DOCUMENTS

| | | | |
|---|---|---|---|
| 460,546 | 10/1891 | Allen | 172/510 X |
| 917,912 | 4/1909 | Tuttle | 172/509 |
| 1,150,847 | 8/1915 | Berger | 172/510 X |
| 3,301,332 | 1/1967 | Burgin | 172/509 |
| 3,804,179 | 4/1974 | Johnson | 172/513 X |
| 4,485,878 | 12/1984 | Uken | 172/510 |
| 5,082,063 | 1/1992 | Sidders | 172/124 X |

Primary Examiner—Dennis L. Taylor
Assistant Examiner—Jeffrey L. Thompson
Attorney, Agent, or Firm—Lawrence M. Nawrocki

[57] ABSTRACT

An attachment for use with an agricultural implement to protect a row of emergent plants growing in a field. The device includes a shield which protects the plants from accumulations of soil, trash, and other debris. The shield is mounted between one or more claws of the implement, on one hand, and the row of plants to be protected on the other hand. Means, such as a motor, are provided to drive the shield in a plane generally parallel to the row of plants. As the shield is positively rotated, a periphery of the shield passes closely proximate the surface of the ground in which the row of plants is located. Such driving of the shield is in a direction in which the shield would rotate if it were allowed to freewheel and were made to rotate as a result of its engagement with the ground.

5 Claims, 2 Drawing Sheets

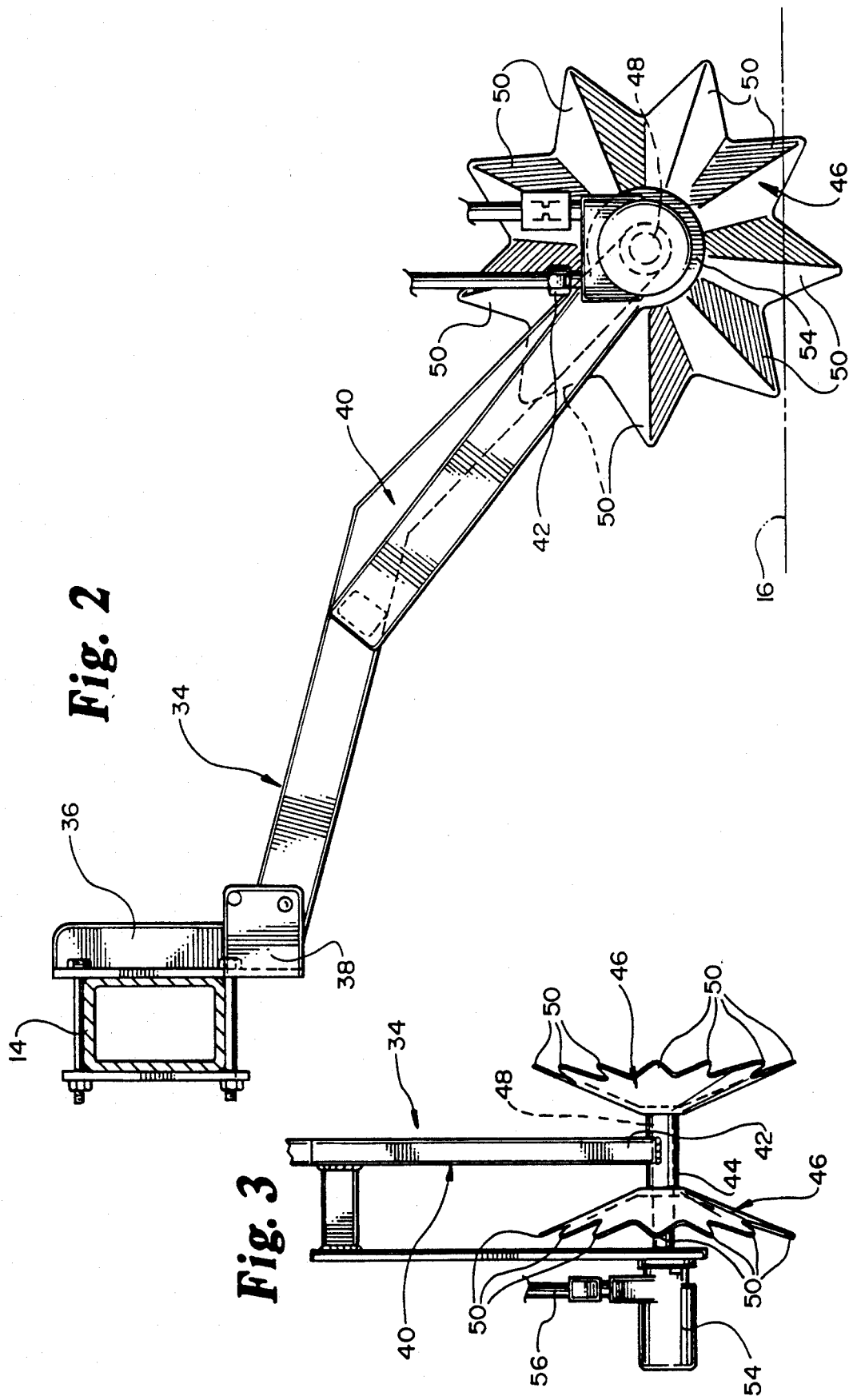

CULTIVATOR ATTACHMENT

TECHNICAL FIELD

The present invention deals broadly with the field of agriculture. More specifically, however, it is related to cultivators employed in effecting weed control and aeration of soil. The specific focus of the invention is structures employed to shield rows of young, fragile emergent plants as claws of a cultivator structure pass closely proximate those rows.

BACKGROUND OF THE INVENTION

Various functions are performed in farming. In today's technological society, such functions are very frequently automated. One significant problem in contemporary farming is soil erosion. An additional significant problem is soil conservation. Both of these problems should, appropriately, be addressed by a farmer.

The soil conservation problem considers ground water pollution. Such pollution results from usage of chemical pesticides and herbicides. Usage of such chemical products enables weed reduction.

The erosion problem can be significant. During the winter season, topsoil can be dislocated by the elements. The value of a field which was once an asset, can, thereby, be diminished.

The erosion problem can, in some measure, be solved by retaining a trash build-up on the surface over the winter season. Such build-up serves to inhibit the transfer of topsoil from one location to another.

When trash build-up is facilitated in order to minimize soil erosion, problems can arise when cultivation is performed in the immediate succeeding year. The presence of trash can result in the collection, accumulation, and jamming of various components of a cultivator. "Plowing" of the soil can consequently result. Such "plowing" can result in the burying and significant damaging of young emergent plants.

As previously discussed, in order to effect minimization of soil erosion, there should be a significant amount of trash left on the soil between planting years. Such trash residue functions to protect the soil from wind and water.

A farmer is constantly confronted by the problem of potential damage which might be occasioned upon his young plants because of trash being dragged along by a cultivator. Various solutions have been proposed to solve this problem. One takes the form of a shield which is carried by the cultivator and is positioned relative to a row of young plants. The row will be insulated from the "plowing" of soil by the claws of the cultivator and trash accumulating in the claws. Typically, such shields are disk-shaped in form and are disposed on the cultivator frame for rotation about an axis generally transverse to the direction of movement of the cultivator through the field. Being so disposed, they are able to rotate in planes substantially parallel to those of emergent plants.

It has become clear that such disk-shaped shields should be able to freewheel. If the shields are able to freewheel, there is a significantly less likelihood that a plowing effect will be created by one or more of the wheels and that the shield will have a detrimental effect rather than a favorable effect. In view of the desire, and even necessity, that trash be allowed to remain in the field to minimize soil erosion, however, it has been found that there is a tendency of such freewheeling disk-like shields to become jammed by the trash. As a result, detrimental effects can result to the crop being cultivated.

It is to these dictates and problems of the prior art that the present invention is directed. It is a cultivator shield attachment which functions positively to pass trash through the cultivator as the cultivator passes over the field. Consequently, the cultivator shields do not become jammed by the trash which might result in soil being plowed over the crop rows.

SUMMARY OF THE INVENTION

The present invention is a device which functions to protect a row of emergent plants growing in a field. The device is a shield which protects the plants from accumulations of soil, trash, and other debris which are created by, or become caught in, one or more claws of an agricultural implement such as a cultivator. The device includes a shield and means for rotatably mounting the shield at a location between the claw or claws, on the one hand, and the row of plants to be protected, on the other hand. The shield is positioned to define a plane substantially parallel to the row of plants (that is, substantially parallel to an intended direction of movement of the agricultural implement over the ground). Further, the shield is disposed so that it is able to be positioned with an outer periphery thereof in close proximity to the surface of the ground. The outer periphery may be either above or below the ground's surface. Finally, the device includes a mechanism for positively driving the shield rotationally. The shield is driven in a direction in which it would tend to be rotated if it were permitted to freewheel and were engaged by the ground as the implement were towed by a tractor.

In the preferred embodiment, the shield comprises a disc-like member. That embodiment of the shield includes a plurality of angularly-spaced protrusions which extend radially.

Further in the preferred embodiment, means are provided to vary the height at which the shield is disposed with respect to the surface of the ground. Such means can take the form of an arm which extends rearwardly from a transverse member of the agricultural implement. Height variation can be accomplished by disposing the arm so that it is pivotally mounted to the transverse member so that, as it is made to pivot, the height of the shield will vary.

In the preferred embodiment, the means by which the shield is positively driven can comprise a motor. Typically, the motor would be a hydraulic motor. Consequently, power for the motor could be provided from the hydraulic system of the tractor which tows the agricultural implement.

The present invention is thus an improved attachment for use with an implement such as a cultivator. The attachment functions to shield rows of plants from "plowed" soil, trash, and other debris which is accumulated by, for example, claws of a cultivator. More specific features and advantages obtained in view of those features will become apparent with reference to the DETAILED DESCRIPTION OF THE INVENTION, appended claims, and accompanying drawing figures.

BRIEF DESCRIPTION OF THE DRAWINGS

FIG. 2 is a sectional elevational view thereof taken generally along line 2—2 of FIG. 1; and FIG. 3 is a fragmentary rear elevational view of the attachment.

DETAILED DESCRIPTION OF THE INVENTION

Figure 1:
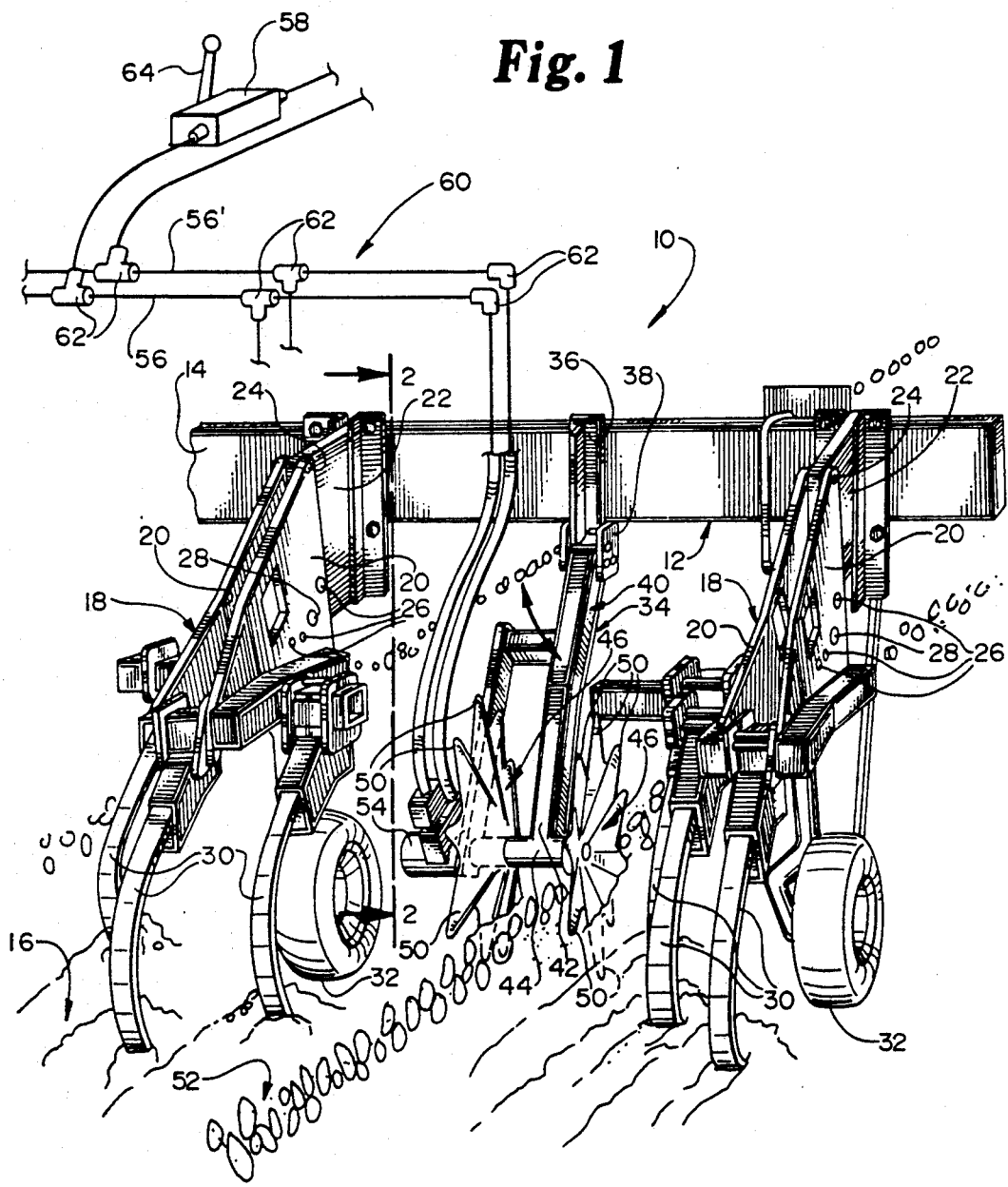
FIG. 1 is a fragmentary perspective view of the present attachment as mounted to a cultivator.

Referring now to the drawings wherein like reference numerals denote like elements throughout the several views, FIG. 1 illustrates a portion of a cultivator agricultural implement 10 as would be towed behind a farm tractor (not shown). Typically, the cultivator frame 12 includes a member 14 which extends generally transversely to the intended direction of movement of the tractor/implement over the ground 16. The frame 12, in turn, mounts a plurality of claw assemblies 18, two of which are shown in FIG. 1. Each claw assembly 18 is illustrated as having a pair of braces 20 which, through a support 22, extend rearwardly from the transverse member 14. The braces 20 are mounted to the support by a pivot pin 24, and a plurality of arcuately spaced apertures 26 are formed in the braces 20, corresponding apertures in the braces 20 being brought into alignment with an aperture 26 in the support 22 and a toggle pin 28 being inserted through the registered apertures in order to achieve a desired angle of extension of the braces 20 with regard to the transverse member 14.

FIG. 1 illustrates a triune claw structure as being carried by each brace pair 20. It is intended that the brace assembly be angled with respect to the transverse member 14 such that the claws 30 of the claw assembly 18 dig into the soil 16 as the tractor/implement tandem assembly moves over the ground 16.

FIG. 2 illustrates the claws 30 of an assembly 18 being carried by the corresponding brace pair. Such mating is accomplished in any appropriate manner, and any number of mating methods could be utilized.

FIG. 1 also illustrates each claw assembly structure 18 as having a bogie wheel 32. Such a bogie wheel 32 is intended to serve a purpose as is customary in the prior art. Consequently, no further discussion will be given of that structure.

FIG. 1 shows a shield assembly 34 employing the present invention as being mounted to the transverse member 14 also. A hanger bracket 36 is secured to the transverse member 14 to mount the shield assembly 34. A lower end of the hanger bracket 36 is provided with a pivot brace 38 from which a pivotally mounted arm 40 extends. The arm 40, it is intended, extends rearwardly and downwardly from the transverse member 14 of the implement 10.

A lower end 42 of the arm 40 mounts a hub 44, the hub 44, in turn, carrying a pair of shields 46 with each of the shields 46 being journalled at an opposite end of the hub 44. Mounting of a shield 46 to the hub 44 can be accomplished in any appropriate manner. Typically, however, the shields 46 could be splined to a common shaft 48 for a reason that will become apparent hereinafter.

As seen in FIGS. 1-3, a disc-like shield 46 is illustrated. The shield 46 shown, however, is provided with a plurality of angularly-spaced, radially extending protrusions 50. In a sense, these protrusions 50 define teeth which, as will become apparent hereinafter, function to feed debris through the cultivator as the cultivator encounters such debris as it is passed through a field.

FIG. 1 illustrates the cultivator as being towed through the field so that the pair of shields 46 straddle a row 52 of emergent plants. As previously discussed in this document, such young plants tend to be fragile, and they can become buried or damaged by soil plowed up by the claws 30 and by trash which might become caught in the claws 30 or other structure.

The shields 46 are disposed, basically, to define planes which are substantially parallel to the row 52 of plants and, therefore, an intended direction of movement of the agricultural implement 10 through the field. It is intended that the arm 40 extending downwardly and rearwardly from the transverse member 14 of the implement 10 be substantially aligned with a row 52 of plants. When this is successfully accomplished, the shields 46 will be spaced closely proximate, and laterally from, the row 52 of plants. Consequently, they will be able to serve as baffles to divert any trash or soil away from the plant row 52.

FIG. 2 illustrates the desirable vertical position of a shield 46 relative to the surface 16 of the soil of the field. Certainly, it is not essential that the protrusions 50 of the shield 46 dig into the ground 16. Such a relationship is shown in FIG. 2, but it is not mandatory. Under certain circumstances, in fact, it might even be appropriate where the distal ends of the various protrusions 50 do not even touch the ground 16, although, most certainly, it would be desirable that they be closely spaced from grade. Positioning of the disc shields 46 would be achieved by pivoting the arm 40, as previously discussed, in order to effect the desired relationship of the shields 46 to the ground 16 in view of all of the circumstances.

FIGS. 1 and 3 best illustrate a motor 54, a rotatable member (not shown) of which is rigidly linked to the shaft 48 to which the shields 46 are mounted. As the motor 54 is actuated, therefore, the shields 46 will be positively driven. It is intended that the shields 46 be driven in a direction in which they would rotate if they were freewheeling and rotated by their engagement with the ground surface 16. Consequently, trash engaged by the shields 46 will be drawn through the attachment beneath the shields 46 thereof and will not collect within, and jam, the shield assembly 34.

FIG. 1 illustrates a hydraulic operating motor 54. A pair of lines 56, 56', pressure and return, are illustrated as extending between the motor 54 and a fluid control valve 58. It is intended that the fluid control valve 58 be positioned in a location accessible to the operator of the tractor drawing the agricultural implement 10 therebehind. The valve 58 could take off from the primary hydraulic system of the tractor and would, therefore, be positioned most likely in the cab of the tractor. The pressure and return lines 56, 56' of the hydraulic system 60 would extend from the primary system of the tractor, through the fluid control valve 58 to the hydraulic motor 54. These lines 56, 56' could be maintained in desired locations by employment of a plurality of fittings 62.

Operation of the fluid motor 54 would be accomplished by manipulation of the fluid control valve 58. FIG. 1 illustrates a control lever 64 as being provided for this purpose. By employment of such a drive system for the shields 46, positive rotation of the shields 46 can be effected. Various salutary effects can, thereby, be achieved.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claim is:

1. Apparatus for shielding a row of fragile emergent plants in a field from accumulations of soil, trash, and other debris created by one or more claws of an agricultural implement, comprising:
   (a) a shield, said shield including a pair of disc-like members journaled at opposite ends of a hub;
   (b) means for rotatably mounting said shield with one of said disc-like members between said one or more claws and the row of plants to be protected, wherein said shield members are positioned to define planes substantially parallel to an intended direction of movement of the implement over the ground and able to be disposed with an outer periphery thereof in close proximity to the surface of the ground with said fragile emergent plants between said pair of disc-like members in operation; and
   (c) motor means for positively driving said shield rotationally in a direction in which said shield would tend to be rotated by engagement with the surface of the ground.

2. Apparatus in accordance with claim 1 wherein said pair of disc-like members include a plurality of radially-extending, angularly-spaced protrusions.

3. Apparatus in accordance with claim 1 further comprising means for varying the height at which said shield is disposed with respect to the surface of the ground.

4. Apparatus in accordance with claim 3 wherein said varying means comprises an arm extending rearwardly from a transverse member of the agricultural implement, said arm being pivotally mounted to said transverse member.

5. Apparatus in accordance with claim 1 wherein said driving means comprises a hydraulic motor driven by a hydraulic system of a tractor towing the agricultural implement.

* * * * *